Jan. 25, 1927.

O. H. ESCHHOLZ 1,615,687

AUTOMATIC ARC WELDING APPARATUS

Filed March 17, 1924

WITNESSES:
G. S. Neilson
J. C. Bierman

INVENTOR
Otto H. Eschholz
BY
Wesley G. Carr
ATTORNEY

Patented Jan. 25, 1927.

1,615,687

UNITED STATES PATENT OFFICE.

OTTO H. ESCHHOLZ, OF BEAVER, PENNSYLVANIA, ASSIGNOR TO WESTINGHOUSE ELECTRIC & MANUFACTURING COMPANY, A CORPORATION OF PENNSYLVANIA.

AUTOMATIC ARC-WELDING APPARATUS.

Application filed March 17, 1924. Serial No. 699,643.

This invention relates to welding, more particularly to a fusible metal arc welding system in which the feed of the electrode is controlled automatically.

It is highly desirable in fusible electrode arc welding systems to provide an automatic control of the electrode feed to maintain a short arc of constant length, since the maintenance of a constant arc length results in good welds. It has been proposed to control the electrode feed by a motor driven at a constant speed and mechanically connected to a clutch arrangement whereby upon changes in the current passing through the arc, the clutch is actuated in one direction or the other to vary the speed and the direction of feed of the electrode to maintain the arc length sufficiently constant for welding.

It has also been proposed to connect the feeding motor either directly or through reduction gearing to rolls which feed the electrode to the work being welded and to vary the excitation of the motor in accordance with a variable characteristic of the arc, such as the voltage thereof or the current passing through the same.

Such devices are fairly satisfactory in that they tend to maintain the required constant arc length, but because of the inertia of the relatively large number of parts, there is a considerable lag between the change in the welding circuit and the corresponding change in electrode feed. Because an appreciable amount of current is drawn from the welding circuit, additional changes which are not due to changes in the arc, cause variations in the electrode feed.

My invention is intended to obviate these disadvantages, it being among the objects thereof to provide an automatic arc welding system in which the control of the electrode feed shall be sensitive and accurate.

In practicing my invention, I provide a source of current connected to the welding circuit and a motor for feeding the electrode to the work. I also provide a vacuum tube device having three electrodes so connected to the welding circuit that changes of voltage across the arc or changes of current passing therethrough are impressed upon the tube. This causes a correspondingly varying current to pass from an independent source through a field for the motor which may oppose or augment the main field thereof and thus vary the speed of the motor and of the electrode feed.

Figure 1:
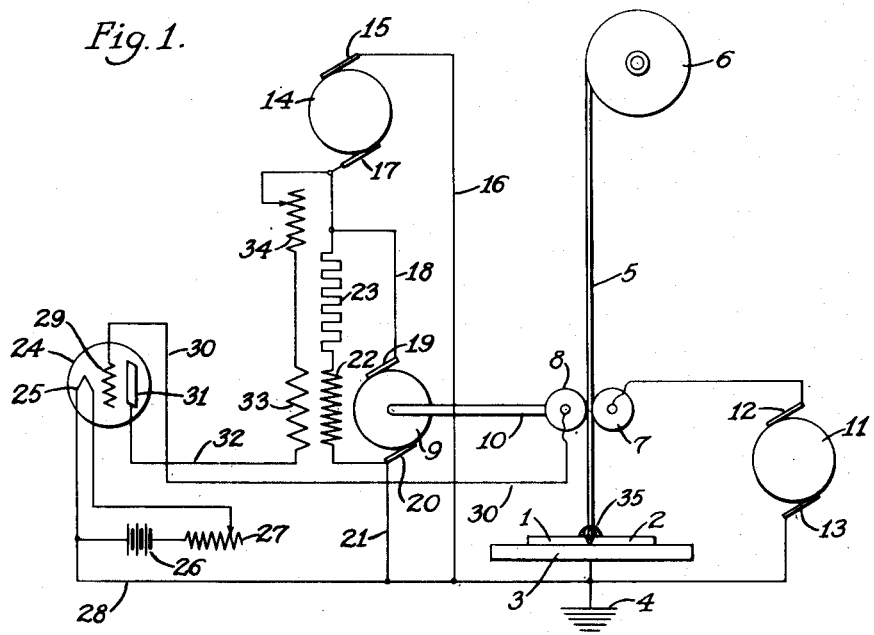
Figure 2:
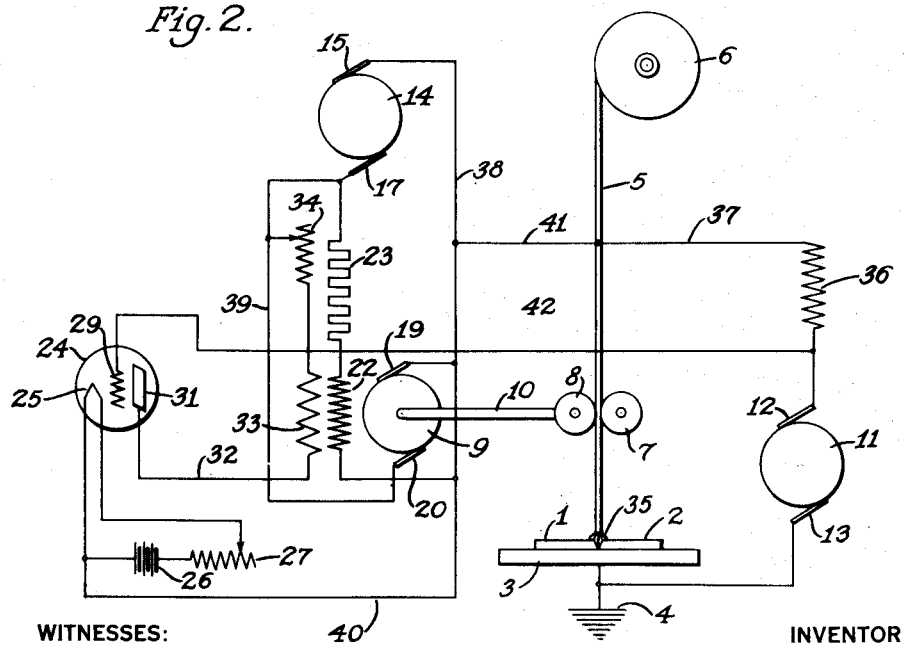

In the accompanying drawings constituting a part hereof and in which like reference characters indicate like parts, Figure 1 is a diagrammatic view showing one arrangement for practicing my invention, and Fig. 2 is a similar view showing a slight modification thereof.

I provide a pair of plates 1 and 2 with beveled edges, along which the same are to be welded together, and place said plates on a member 3, which is adapted to be moved in a direction at right-angles to the arc in order to present thereto new surfaces to be welded. The member 3 is connected to ground 4. A fusible electrode 5 is drawn from a reel 6 and passes between a pair of feed rolls 7 and 8, one of which is operatively connected to feed motor 9 by a shaft 10 if the motor is a slow-speed motor, or through reduction gears if it is a high-speed motor. A main generator 11 has its brushes 12 and 13 connected to feed roll 7 and ground 4, respectively, to provide the welding current for the arc.

An auxiliary generator 14 has one of its brushes 15 connected by lead 16 to ground 4 and the other brush 17, by lead 18 to brush 19 of the motor 9. Brush 20 thereof is connected to ground by lead 21. A field winding 22 having a resistor 23 in series therewith is connected in shunt to the motor 9 and the exciter 14.

A vacuum tube 24 has a filament 25 energized by a circuit including the battery 26 and variable resistor 27, and which is connected to ground by lead 28. The grid 29 is connected by lead 30 to roll 8 and plate 31 is connected by lead 32 to field winding 33, which is opposed to winding 22, and its series variable resistor 34 to brush 17 of the exciter 14.

In the operation of my device, the main and auxiliary generators are energized, causing current to flow through the generator and motor circuits respectively. The arc 35 may be initiated in any well-known manner. Because of the energization of the armature and shunt field of the motor, it rotates causing rolls 7 and 8 to revolve, feeding electrode 5 to the work. The voltage of the arc is impressed between the grid 29 and filament 25 of the vacuum tube, resulting in a difference of potential therebetween, which causes a change in the magnitude of the current passing between filament 25 and plate 31 and through field winding 33. The tube characteristics are such that when a predetermined voltage is impressed upon the arc, a predetermined current will flow in field winding 33.

Upon changes in arc length because of variations occurring in the welding operation, the voltage of the grid 29 changes, causing corresponding instantaneous changes to occur in the current passing through field 33, thereby changing the speed of the motor to correctively vary the feed of the electrode. No energy is taken from the welding circuit, and the voltage changes impressed upon the tube are instantaneously operative to change the current through winding 33. I am thereby enabled to obtain an extremely sensitive control of the feed of the electrode in accordance with changes in the arc.

In Fig. 2, I have shown a similar system in which the difference of voltage between the grid and filament is controlled by the current through the arc. For this purpose, there is provided an impedance 36 in series with the generator 11 and connected to the electrode 5 by lead 37. The brush 15 of the auxiliary generator 14 is connected to brush 19 of motor 9 by lead 38, and the brush 17 thereof is connected by lead 39 to the other brush 20 of the motor. The filament 25 is connected to one side of the impedance 36 by leads 40 and 41, and the grid 29 is connected to the other side of the impedance by lead 42.

The operation of this form of my invention is quite similar to that of Figure 1. Current flowing from the generator through the arc causes an impedance drop in impedance 36, which is impressed as a difference of voltage between grid 29 and filament 25. This results in changes in current through field winding 33, causing changes in the motor speed and, therefore, in the feed of electrode to the work.

Although I have described my invention setting forth several embodiments thereof, various changes may be made therein within the scope of my invention. For instance, the arrangement of field windings for the motor may be other than shown herein and other sources of energy for both the motor and the welding circuits may be employed. My invention contemplates, broadly, the use of a vacuum device for controlling the length of the arc, as specified in the claims appended hereto.

I claim as my invention:

1. An automatic arc welding system including a source of welding current, a fusible electrode, means for feeding the electrode to maintain a welding arc, a space-current device for controlling the feeding of said electrode, and means responsive to a condition of said arc and drawing substantially no current from said arc for so controlling said space-current device as to maintain the length of said arc substantially constant.

2. An automatic arc welding system including a source of welding current, a fusible electrode, a motor for feeding the same to maintain a welding arc, means for controlling the speed of said motor to maintain the arc length substantially constant comprising a vacuum device, said vacuum device having three electrodes upon two of which a change in an electrical characteristic of the arc is impressed.

3. An automatic arc welding system including a source of welding current, a fusible electrode, a motor for feeding the same to maintain a welding arc, means for controlling the speed of said motor to maintain the arc length substantially constant comprising a vacuum device, said vacuum device having three electrodes upon two of which a change in an electrical characteristic of the arc is impressed causing varying currents to flow between one of said two electrodes and the third to vary the excitation of said motor.

4. An automatic arc welding system including a source of welding current, a fusible electrode, a motor for feeding the same to maintain a welding arc, means for controlling the speed of said motor to maintain the arc length substantially constant comprising a vacuum device, said vacuum device having three electrodes upon two of which a drop in the welding circuit is impressed to control the motor speed.

5. An automatic arc welding system including a source of welding current, a fusible electrode, a motor for feeding the same to maintain a welding arc, means for controlling the speed of said motor, to maintain the arc length substantially constant comprising a vacuum device, said vacuum device having three electrodes upon two of which an impedance drop in the welding circuit is impressed to control the motor speed.

6. An automatic arc welding system including a source of welding current, a fusible electrode, a motor for feeding the same to maintain a welding arc, means for controlling the speed of said motor to maintain the arc length substantially constant comprising a vacuum device, said vacuum device having three electrodes upon two of which a voltage drop in the welding circuit is impressed to control the motor speed.

7. An automatic arc welding system including a source of welding current, a fusible electrode, a motor for feeding the same to maintain a welding arc and means for controlling the speed of said motor to maintain the arc length substantially constant comprising a vacuum device having a grid, a filament and a plate said grid and filament being connected in the welding circuit, and said filament and plate being connected in the motor circuit.

8. An automatic arc welding system including a source of welding current, a fusible electrode, a motor for feeding the same to maintain a welding arc opposed field circuits in said motor and means for controlling the speed of said motor to maintain the arc length substantially constant comprising a vacuum device having a grid, a filament and a plate, said filament and plate being connected to one of said opposed motor field circuits.

In testimony whereof, I have hereunto subscribed my name this 11th day of March, 1924.

OTTO H. ESCHHOLZ.